(12) United States Patent
Stefan et al.

(10) Patent No.: US 11,354,441 B2
(45) Date of Patent: Jun. 7, 2022

(54) SECURING DATA ACROSS EXECUTION CONTEXTS

(71) Applicant: VMware, Inc., Palo Alto, CA (US)

(72) Inventors: Deian Stefan, Palo Alto, CA (US); Devon Rifkin, Palo Alto, CA (US); Christian Almenar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 233 days.

(21) Appl. No.: 16/794,609

(22) Filed: Feb. 19, 2020

(65) Prior Publication Data

US 2020/0265165 A1 Aug. 20, 2020

Related U.S. Application Data

(60) Provisional application No. 62/807,869, filed on Feb. 20, 2019.

(51) Int. Cl.
*G06F 21/62* (2013.01)
*G06F 21/60* (2013.01)
*G06F 21/53* (2013.01)

(52) U.S. Cl.
CPC .......... *G06F 21/6281* (2013.01); *G06F 21/53* (2013.01); *G06F 21/602* (2013.01); *G06F 21/604* (2013.01)

(58) Field of Classification Search
CPC .... G06F 21/6281; G06F 21/53; G06F 21/602; G06F 21/604
See application file for complete search history.

(56) References Cited

U.S. PATENT DOCUMENTS

2015/0270964 A1\* 9/2015 Yasuda ................. H04L 9/0825
713/171
2016/0371495 A1\* 12/2016 Bhat ..................... G06F 21/445

\* cited by examiner

*Primary Examiner* — Ayoub Alata
(74) *Attorney, Agent, or Firm* — Patterson + Sheridan, LLP

(57) ABSTRACT

Embodiments herein relate to new and useful systems and methods for tokenization across code trust boundaries. An embodiment includes a method for securing data across execution contexts in a computing device. The method includes determining that first data is to be passed from a first code in a first execution context to a second code in a second execution context. The method further includes, based on determining that the first data is to be passed, tokenizing the first data to generate tokenized first data, wherein tokenizing the first data comprises substituting the first data with second data that is based on the first data to secure the first data from the second code, the second data being the tokenized first data. The method further includes passing the tokenized first data from the first code to the second code.

15 Claims, 2 Drawing Sheets

200

Receiving Application Instructions S210

Receiving Security Policy Instructions S220

Generating Initial Node Context S230

Generating Sandboxed Context S240

Executing Application Instructions S250

Identifying Sensitive Information S251

Tokenizing Sensitive Information S252

De-tokenizing Sensitive Information S253

SECURING DATA ACROSS EXECUTION CONTEXTS

CROSS-REFERENCE TO RELATED APPLICATIONS

This application claims the benefit of U.S. Provisional Patent Application Ser. No. 62/807,869, filed Feb. 20, 2019, the entire content of which is incorporated by reference herein.

BACKGROUND

This disclosure relates generally to the computer security field, and more specifically to embodiments of new and useful systems and methods for tokenization across code trust boundaries.

SUMMARY

Once a rare occurrence in the software community, major security breaches have now become almost commonplace. This is not surprising: as software has become ubiquitous, so have opportunities to exploit it. The software community has attempted to address the problem of computer security in myriad ways, but these often suffer either from impaired flexibility or inadequate efficacy. For example, traditional runtime security solutions try to defend against application-level attacks via analysis or monitoring; however, this approach may let new or unusually creative exploits slip through the cracks. Further, even in systems where potentially dangerous code can be isolated, the possibility that sensitive data may be passed to the contexts in which such code is executed is an issue. Thus, there is a need in the computer security field to create new and useful systems and methods for tokenization across code trust boundaries. This disclosure provides embodiments of such new and useful systems and methods.

DETAILED DESCRIPTION

The following description is not intended to limit the disclosure to these embodiments, but rather to enable any person skilled in the art to make and use these or similar embodiments.

1. System for Tokenized Intrinsic Runtime Security

Figure 1:
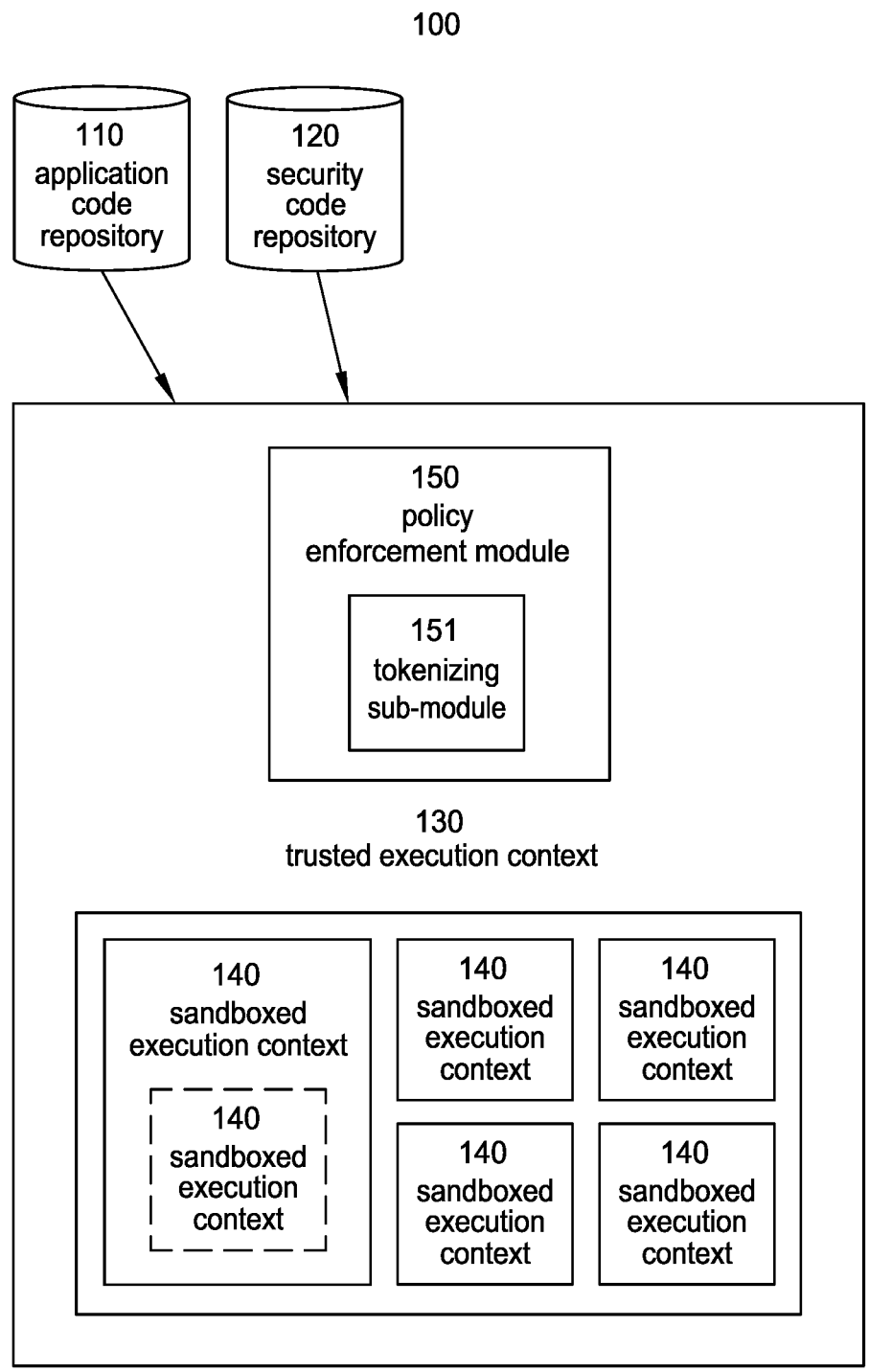
FIG. 1 is a diagram view of a system of an embodiment.

A system 100 for tokenized intrinsic runtime security includes an application code repository 110, a security code repository 120, a trusted execution context 130, one or more sandboxed execution contexts 140, and a policy enforcement module 150 (including a tokenizing sub-module 151) as shown in FIG. 1.

The system 100 functions to enable the execution of untrusted code in a safe, flexible, and effective manner. By intelligently executing code (received from the application code repository 110) in a trusted execution context 130 or one or more sandboxed execution contexts 140, the system 100 may significantly reduce the risks inherent in running untrusted code. Basing the parameters of operation of the system 100 on security policies (received from the security code repository 120), the system 100 may enable consistent safe execution of any suitable application run with the system 100. Such policies are mediated by the policy enforcement module 150.

The tokenizing sub-module 151 of the policy enforcement module 150 functions to manage the tokenization and detokenization of information deemed sensitive (or otherwise desirable to tokenize). Tokenization allows for untrusted code to interact with sensitive information with substantially reduced risk (since the untrusted code cannot directly access the sensitive information). While this generally may be used to improve computer security, tokenizing may be particularly important for complying with data privacy laws, including PCI and GDPR. For example, Recital 39 of the GDPR requires that "personal data should be processed in a manner that ensures appropriate security and confidentiality of the personal data, including for preventing unauthorized access to or use of personal data and the equipment used for processing," while Article 32 specifies that personal data should be pseudonymized and encrypted (e.g., via tokenization) where possible.

Tokenization as a technique to improve data security across trust boundaries in traditional implementations operates by establishing tokenization servers for all sensitive data; in such implementations tokenization can occur only for data transmitted at network-layer. Note that "sensitive" data is any data for which tokenization is required and/or desired.

By direct integration into the system 100, the tokenizing sub-module 151 can enable tokenization both more flexibly and in more scenarios (e.g., for information received from direct file system access, for information passed as environment variables in code, etc.).

The system 100 preferably operates on prototypal languages such as JavaScript (and may be particularly useful for language runtimes like Node.js), but may additionally or alternatively operate on code written in any suitable programming language.

The system 100 is preferably implemented as a library for such a prototypal language, enabling the execution of existing code without modifying runtime systems, but may additionally or alternatively be implemented in any manner.

The application code repository 110 functions to contain application code meant to be executed using the system 100. Likewise, the security code repository 120 functions to contain security policies meant to direct operation of the system 100 while executing the application code. Code stored by the repositories 110 and 120 may be of any type (any set of instructions, compiled or uncompiled); the repositories 110 and 120 may store code in any manner. The security code repository 120 may be distinct and isolated from the application code repository 110; alternatively, security code and application code may be stored in the same place. Note that isolating the security code repository 120 may allow the repository 120 to serve as a centralized source of security policy for many different applications. Isolation of the code repositories may be performed in any manner; for example, by requiring one set of credentials (or a first level of access) to modify the application code repository 110, while requiring a different set of credentials (or a second level of access) to modify code in the security code repository 120.

Security policies stored in the security code repository 120 may specify any security parameters of the system 100; e.g., security policies may dictate the operation of the policy enforcement module 150 while running application code.

For example, security policies may be used to determine how code is sandboxed (e.g., which sections of code are executed as trusted vs. untrusted, how execution of untrusted code is distributed across sandboxed execution contexts, permissions and access for individual sandboxed execution contexts, etc.). Security policies may also be used to specify object management between contexts; for example (as discussed in later sections), the system 100 may accomplish secure object sharing between a trusted execution context 130 and a sandboxed execution context 140 using one of several distinct techniques; security policies may be used to specify (e.g., per object type and/or per sandboxed execution context 140) which of these techniques is used to accomplish secure object sharing.

Security policies may additionally or alternatively be used to dictate parameters of tokenization (e.g., what kinds of data are to be tokenized, how tokens are generated, how tokens are managed, how tokens are detokenized, etc.).

Security policies may be whitelist policies; e.g., for each object type, the methods and fields for which access should be provided are explicitly specified (rather than specifying methods and fields for which access should be denied). Additionally or alternatively, security policies may be operable in any manner. For example, security policies may include blacklist policies (e.g., for an object type, the methods and fields for access should not be provided).

The trusted execution context 130 functions to execute code trusted to have unrestricted access to a set of system resources, and in doing so, manage the access of code executed in sandboxed execution contexts 140 to those resources. Of the execution contexts of the system 100, the trusted execution context 130 preferably has the greatest access to system resources (i.e., more than that of any individual sandboxed execution context 140), though the trusted execution context 130 may not necessarily have full access to all resources of a given computer (e.g., code running on a web server that is running in a virtual machine may not have access to the server's BIOS, even if executed in the trusted execution context 130). The system 100 may have a single trusted execution context 130 that manages all sandboxed execution contexts 140; additionally or alternatively, the system 100 may have any number of trusted execution contexts 130.

The trusted execution context 130 may be used to execute any code designated as trusted in the application code repository 110, but may additionally or alternatively execute any code trusted to access the resources available to the context 130. Code may be designated as trusted in any manner; for example, code may be designated as trusted manually; alternatively, code may be designated as trusted automatically based on the source and/or type of code. Note that if code is designated as trusted or not trusted automatically, it may be designated in any manner (e.g., after analysis of the code by the policy enforcement module 150).

Sandboxed execution contexts 140, also referred to as sandboxes, function to execute code not trusted to have unrestricted access to a set of system resources. A sandboxed execution context 140 may be used to execute any code not designated as trusted in the application code repository 110, but may additionally or alternatively execute any code trusted to access the resources available to a given sandboxed context 140.

Sandboxed execution contexts 140 are linked to one or more trusted execution contexts 130 and are able to access some of the resources available to the trusted execution contexts 130. Compared to trusted execution contexts 130; however, the access and/or privileges of the sandboxed execution contexts 140 are restricted. Note that additionally or alternatively, sandboxed execution contexts 140 may have nested sandboxed execution contexts (for which the higher-level sandboxed execution context operates similarly to a trusted execution context 130).

While the system 100 may have only a single sandboxed execution context 140, the system 100 may have multiple sandboxed execution contexts 140.

Given the possibility of multiple sandboxed execution contexts 140, code may be selected to execute in one of them based on any criteria. In a first example, a new sandboxed execution context 140 is created for each separate untrusted program or process executed by the system 100. Alternatively, multiple programs and/or processes may be run in the same sandboxed execution context 140 (e.g., if those programs need substantial access to each other's resources). Note that a single application may likewise be split among a plurality of sandboxed execution contexts 140.

Likewise, the restrictions applied to sandboxed execution contexts 140 may be set in any manner. For example, a security policy may specify the resources that all sandboxed execution contexts 140 have access to (i.e., the access level of every context 140 is identical). Alternatively, levels of access for sandboxed execution contexts 140 may be specified in any manner. For example, a security policy might specify that code from one source is executed in a sandboxed execution context 140 with a first level of access, while code from other sources is executed in a sandboxed execution context 140 with a second level of access lower than the first. As a second example, the level of access given to a sandboxed execution context 140 may be dependent on the type or purpose of code executed by that context 140 (this may be specified manually or inferred automatically based on the code to be executed or in any other manner).

Restrictions applied to sandboxed execution contexts 140 may be specified in security policies of the security code repository 120, but may additionally or alternatively be specified or determined in any manner.

Note that objects can be passed back and forth between the trusted execution context 130 and "child" sandboxed execution contexts 140. In some cases, functions can be called across sandbox boundaries, where the context of a function may be determined by where it was defined, not who called it. Alternatively, function context may be determined in any manner by the system 100. For example, functions may be restricted, and the system 100 may mediate either or both of function arguments (e.g., by translating or otherwise rewriting them) and return values.

The policy enforcement module 150 functions to make sure that code executed by the system 100 comports with specified security policy. While the policy enforcement module 150 may accomplish this role in many ways (e.g., monitoring and analyzing application behavior at runtime similar to traditional Runtime Application SelfINTN-Protection), the policy enforcement module 150 is particularly used to manage resource sharing between a trusted execution context 130 and sandboxed execution contexts 140 (or between different sandboxed execution contexts 140).

For example, the policy enforcement module 150 may be used to prevent the undesirable modification of object prototypes as described in U.S. patent application Ser. No. 16/147,396, filed on 28 Sep. 2018, the entirety of which is incorporated by reference herein.

In addition to or in the alternative to such function, the policy enforcement module 150 functions to control access to sensitive information via the tokenizing submodule 151.

The tokenizing sub-module 151 functions to identify sensitive information requested or otherwise intended to be passed across a trust boundary of the system 100 (e.g., any boundary between execution contexts in which different exposure to sensitive information is desired). For example, a trust boundary may be between a trusted execution context 130 and a sandboxed execution context 140, or between one sandboxed execution context 140 and another sandboxed execution context 140. Accordingly, the tokenizing sub-module 151 may detect requests across execution context boundaries.

Information may be identified as sensitive in any manner. For example, a security policy may dictate that all data stored in a particular location and/or originating from a particular source may be sensitive and thus must be tokenized whenever passed to un-trusted execution contexts. As a second example, data may be identified as sensitive based on the data content (e.g., anything that looks like an API key, such as a 32 character string environment variable). The tokenizing sub-module 151 may additionally or alternatively identify data as sensitive in any other manner.

Note that "sensitivity" may be measured in a non-binary manner (e.g., "sensitivity level of 1 to 5" instead of "sensitive or not sensitive"). Likewise, trust levels of sandboxed execution contexts 140 may be similarly non-binary. (Note that these may of course be binary as well).

Sensitivity may additionally or alternatively be a function of sandboxed execution contexts (e.g., sandboxed execution context 1 may not be allowed direct access to data categories 1 and 2, while sandboxed execution context 2 may be allowed direct access to data of category 1 but not of category 2).

After identifying information as sensitive, the tokenizing sub-module 151 preferably generates a token for the information. A "token" is any data substituted for the sensitive information that prevents direct access to the sensitive information while still allowing its use in some manner. Tokens used may be generated by homomorphically encrypting sensitive information (so that mathematical operations may be performed on the information without decryption and without exposing the sensitive information) but may additionally or alternatively be generated in any manner (e.g., nonhomomorphic encryption schemes).

The tokenizing sub-module 151 may tokenize all sensitive information using the same tokenization method, but may additionally or alternatively use multiple tokenization methods. For example, a first homomorphic encryption scheme may be used for a first type of sensitive information (which enables a first set of calculations to be performed on this information while tokenized), a second homomorphic encryption scheme may be used for a second type of sensitive information (which enables a distinct second set of calculations to be performed on this information while tokenized), and a third non-homomorphic encryption scheme may be used for a third type of sensitive information. Selecting a tokenization scheme for a particular type of sensitive data may be performed in any manner. For example, the tokenizing sub-module 151 may tokenize data based on the data type (e.g., with the expectation that that data type would not be operated on in a manner computationally inconsistent with the encryption scheme). As a second example, the tokenizing sub-module 151 may tokenize data based on analysis of the code requesting the data (e.g., selecting an encryption scheme for a particular type of data based on the computations performed on that data).

Already-encrypted data (i.e., the encrypted data is itself sensitive), such as API keys, may in some implementations be treated specially by the tokenizing submodule 151. In such implementations, the data may be (if possible) decrypted rather than being encrypted a second time. This may allow, for example, untrusted code to modify parameters of an API key without having the ability to re-encrypt and use the API key (such re-encryption would be performed at the de-tokenization stage). Note that this is technically still an implementation of tokenization (because the sensitive information is the signed API key and the substitute is the data that key is based on; it is assumed that the untrusted context is incapable of re-signing the API key).

Tokenization may be conditional; for example, the tokenizing sub-module 151 may prevent token generation based on operational and/or environmental conditions. Likewise, in some conditions, the tokenizing sub-module 151 may pass data without tokenization.

In addition to token generation being controlled by the tokenizing submodule 151, the tokenizing sub-module 151 may additionally manage tokens (e.g., by setting expiration times or conditions).

Upon detecting that tokenized information is to be passed across a trust boundary, the tokenizing sub-module 151 may de-tokenize (or may re-tokenize) information. For example, the tokenizing sub-module may detect that sensitive data (e.g., a credit card number) is returned by a sandboxed execution context 140 to a trusted execution context 130 and may de-tokenize the data (i.e., return the data to an untokenized form, though the data may be modified from the original sensitive information). As a second example, the tokenizing sub-module 151 may perform an additional tokenization operation on a token (e.g., by de-tokenizing and then re-tokenizing using a different tokenization scheme, or by simply applying a second tokenization scheme to the existing token).

Note that in the case of already encrypted information (e.g., an API key) that is decrypted, the sub-module 151 may re-encrypt the data at the de-tokenization stage if possible. Additionally or alternatively, the sub-module 151 may transmit the decrypted data to a source capable of re-encrypting (re-signing) the information and then receive the re-signed information (which it may then use via the trusted execution context 140 if desired).

Like tokenization, de-tokenization may be conditional based on operational and/or environmental conditions. For example, code in an untrusted execution context 140 may want to send sensitive information to a trusted third party as part of a request to that party. In such a case, the tokenization sub-module 151 may, prior to de-tokenization, verify that the request to the third party still exists and is valid (and if not, may not detokenize the information). Alternatively, the tokenization sub-module 151 may verify the request after de-tokenization but prior to sending the information (and, if not verified, may not send the information).

While these details are specific to certain embodiments, it is understood that the policy enforcement module 150 may additionally or alternatively generally modify any execution context aspects that might expose sensitive information.

2. Method for Tokenized Intrinsic Runtime Security

Figure 2:
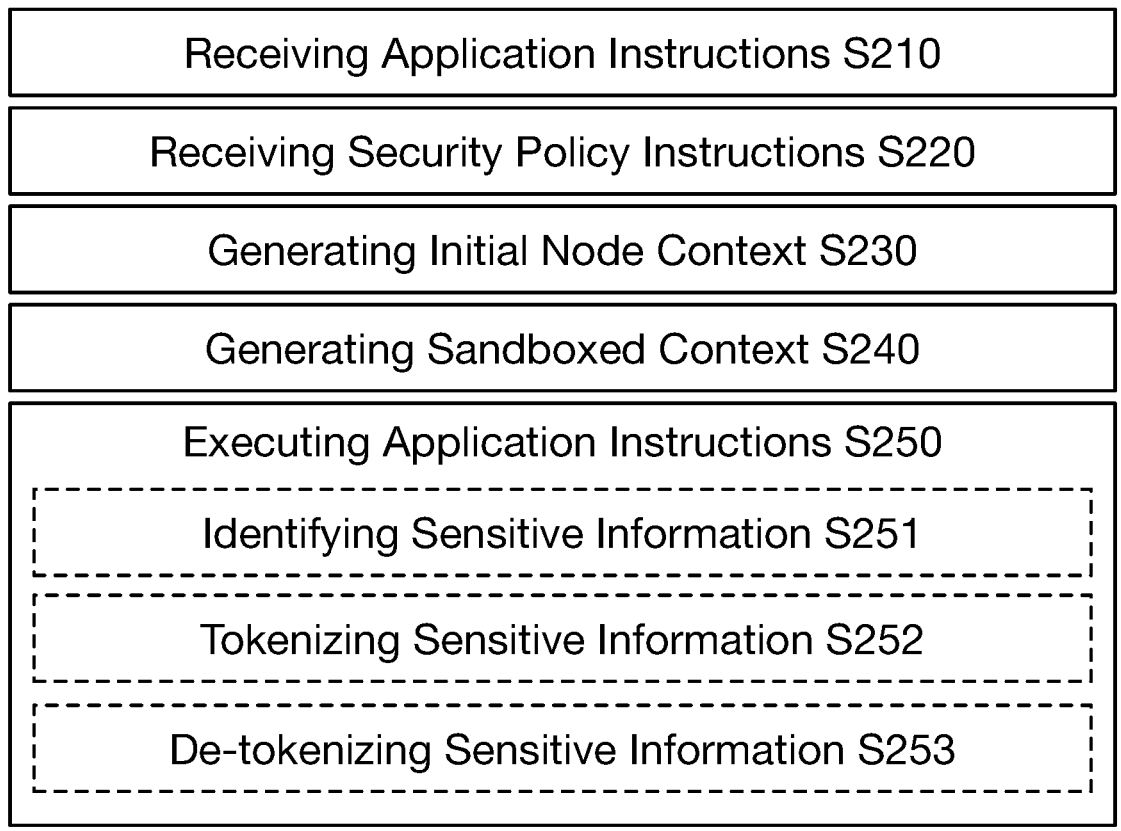
FIG. 2 is a chart view of a method of an embodiment.

A method 200 for tokenized intrinsic runtime security includes receiving application instructions S210, receiving security policy instructions S220, generating an initial context S230, generating a sandboxed context S240, and executing the application instructions in the sandboxed context S250, as shown in FIG. 2.

Similarly to the system 100, the method 200 functions to enable the execution of untrusted code in a safe, flexible, and effective manner. By intelligently executing code (received in S210) in a trusted execution context (generated in S230) or one or more sandboxed execution contexts (generated in S240), the method 200 may significantly reduce the risks inherent in running untrusted code. Code execution (S250) of the method 200 is preferably performed according to security policy instructions (received in S220) and includes performance of tokenization (in S250).

The method 200 may operate on prototypal languages such as JavaScript (and may be particularly useful for language runtimes like Node.js), but may additionally or alternatively operate on code written in any suitable programming language. The method 200 may additionally utilize the system 100, but may additionally or alternatively use any suitable system capable of performing the method 200.

S210 includes receiving application instructions. S210 functions to receive application code, substantially similar to that described in the system 100. S210 may include receiving application instructions in any manner.

S220 includes receiving security policy instructions. S220 functions to receive security policy, substantially similar to that described in the system 100. S220 may include receiving security policy in any manner.

S230 includes generating an initial context. S230 functions to generate a context for executing trusted code. S230 may generate an initial context substantially similar to the trusted execution context 130.

S240 includes generating a sandboxed context. S240 functions to generate a sandboxed context for executing untrusted code. S240 may generate a sandboxed context substantially similar to the sandboxed execution context 140. Note that sandboxed contexts may be created at any time (e.g., one may be created each time a new process is run, several may be created at the beginning of executing some code, etc.). Further, to the extent that restrictions on sandboxes may be implemented at sandbox creation (e.g., patching a sandbox "getPrototypeOf"), S240 may additionally or alternatively include applying these restrictions at sandbox creation (or at any other time).

S250 includes executing the application instructions in the sandboxed context. S250 may include executing sections of code in the initial context and/or a sandboxed context as described in the description of the system 100.

S250 may additionally include executing application instructions according to security policy received in S220. S250 may execute code while modifying application responses as described in the sections on the policy enforcement module 150. For example, S250 may include (while executing code) monitoring access of sandboxed contexts to initial context objects and moving those objects to sandboxed contexts when appropriate. Similar to the policy enforcement module 150, S250 may include preventing sandboxed processes from modifying prototypes of the initial context (and/or of other sandboxed contexts) in any manner.

In an embodiment, S250 may include one or more of identifying sensitive information to be passed across a trust boundary S251, tokenizing the sensitive information S252, and de-tokenizing the sensitive information S253. These steps may be substantially similar to as described in the sections on the tokenizing sub-module 151 of the system 100 (and likewise, S250 may include any functionality described for the tokenizing sub-module 151).

The methods of the embodiment and variations thereof can be embodied and/or implemented at least in part as a machine configured to receive a non-transitory computer-readable medium storing computer-readable instructions. The instructions may be executed by computer-executable components, which may be integrated with a general computing system. The non-transitory computer-readable medium can be stored on any suitable computer-readable media such as RAMs, ROMs, flash memory, EEPROMs, optical devices (CD or DVD), hard drives, floppy drives, or any suitable device. The computer executable component may be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the embodiments without departing from the scope of this disclosure.

We claim:

1. A method for securing data across execution contexts in a computing device, the method comprising:
running, by the computing device, first code in a first execution context, code running in the first execution context having access to a first set of resources of the computing device;
running, by the computing device, second code in a second execution context, code running in the second execution context having access to a second set of resources of the computing device, wherein the first set of resources is different than the second set of resources;
determining that first data is to be passed from the first code in the first execution context to the second code in the second execution context;
based on determining that the first data is to be passed, tokenizing the first data using a first tokenization method comprising a first homomorphic encryption scheme to generate tokenized first data, wherein tokenizing the first data comprises substituting the first data with second data that is based on the first data to secure the first data from the second code, the second data being the tokenized first data;
passing the tokenized first data from the first code to the second code;
modifying, by the second code, the tokenized first data to generate modified tokenized first data;
determining the modified tokenized first data is to be passed from the second code in the second execution context to the first code in the first execution context;
based on determining the modified tokenized first data is to be passed, de-tokenizing the modified tokenized first data to at least in part generate third data; and
passing the third data from the second code to the first code.

2. The method of claim 1, wherein the first tokenization method used to tokenize the first data is selected from a plurality of tokenization methods based on one or more of a type of the first data or a destination of the first data, the destination being the second code.

3. The method of claim 2, wherein the first tokenization method is selected based on a computation to be performed on the first data by the second code.

4. The method of claim 1, wherein based on determining that the first data is to be passed, tokenizing the first data comprises:
based on determining that the first data is to be passed and based on determining the first data is one or more of: of a type of data requiring tokenization, associated with a security policy requiring tokenization, stored at a location requiring tokenization, associated with a source of data requiring tokenization, or has a content requiring tokenization, tokenizing the first data.

5. The method of claim 1, wherein:
the third data is further generated based on tokenizing, using a second tokenization method, the de-tokenized modified tokenized first data.

6. A computing device comprising:
a memory; and
a processor coupled to the memory, the processor and memory being configured to:
 run first code in a first execution context, code running in the first execution context having access to a first set of resources of the computing device;
 run second code in a second execution context, code running in the second execution context having access to a second set of resources of the computing device, wherein the first set of resources is different than the second set of resources;
 determine that first data is to be passed from the first code in the first execution context to the second code in the second execution context;
 based on determining that the first data is to be passed, tokenize the first data using a first tokenization method comprising a first homomorphic encryption scheme to generate tokenized first data, wherein tokenizing the first data comprises substituting the first data with second data that is based on the first data to secure the first data from the second code, the second data being the tokenized first data;
 pass the tokenized first data from the first code to the second code;
 modify, by the second code, the tokenized first data to generate modified tokenized first data;
 determine the modified tokenized first data is to be passed from the second code in the second execution context to the first code in the first execution context;
 based on determining the modified tokenized first data is to be passed, de-tokenize the modified tokenized first data to at least in part generate third data; and
 pass the third data from the second code to the first code.

7. The computing device of claim 6, wherein the first tokenization method used to tokenize the first data is selected from a plurality of tokenization methods based on one or more of a type of the first data or a destination of the first data, the destination being the second code.

8. The computing device of claim 7, wherein the first tokenization method is selected based on a computation to be performed on the first data by the second code.

9. The computing device of claim 6, wherein based on determining that the first data is to be passed, tokenizing the first data comprises:
 based on determining that the first data is to be passed and based on determining the first data is one or more of: of a type of data requiring tokenization, associated with a security policy requiring tokenization, stored at a location requiring tokenization, associated with a source of data requiring tokenization, or has a content requiring tokenization, tokenizing the first data.

10. The computing device of claim 6, wherein:
the third data is further generated based on tokenizing, using a second tokenization method, the de-tokenized modified tokenized first data.

11. A non-transitory computer readable medium storing instructions that when executed by a computing device cause the computing device to perform a method for securing data across execution contexts in the computing device, the method comprising:
 running, by the computing device, first code in a first execution context, code running in the first execution context having access to a first set of resources of the computing device;
 running, by the computing device, second code in a second execution context, code running in the second execution context having access to a second set of resources of the computing device, wherein the first set of resources is different than the second set of resources;
 determining that first data is to be passed from the first code in the first execution context to the second code in the second execution context;
 based on determining that the first data is to be passed, tokenizing the first data using a first tokenization method comprising a first homomorphic encryption scheme to generate tokenized first data, wherein tokenizing the first data comprises substituting the first data with second data that is based on the first data to secure the first data from the second code, the second data being the tokenized first data;
 passing the tokenized first data from the first code to the second code;
 modifying, by the second code, the tokenized first data to generate modified tokenized first data;
 determining the modified tokenized first data is to be passed from the second code in the second execution context to the first code in the first execution context;
 based on determining the modified tokenized first data is to be passed, de-tokenizing the modified tokenized first data to at least in part generate third data; and
 passing the third data from the second code to the first code.

12. The non-transitory computer readable medium of claim 11, wherein the first tokenization method used to tokenize the first data is selected from a plurality of tokenization methods based on one or more of a type of the first data or a destination of the first data, the destination being the second code.

13. The non-transitory computer readable medium of claim 12, wherein the first tokenization method is selected based on a computation to be performed on the first data by the second code.

14. The non-transitory computer readable medium of claim 11, wherein based on determining that the first data is to be passed, tokenizing the first data comprises:
 based on determining that the first data is to be passed and based on determining the first data is one or more of: of a type of data requiring tokenization, associated with a security policy requiring tokenization, stored at a location requiring tokenization, associated with a source of data requiring tokenization, or has a content requiring tokenization, tokenizing the first data.

15. The non-transitory computer readable medium of claim 11, wherein:
the third data is further generated based on tokenizing, using a second tokenization method, the de-tokenized modified tokenized first data.

* * * * *